Nov. 27, 1934.  F. G. STEINER  1,981,971
MIRROR MOUNTING
Original Filed June 17, 1929
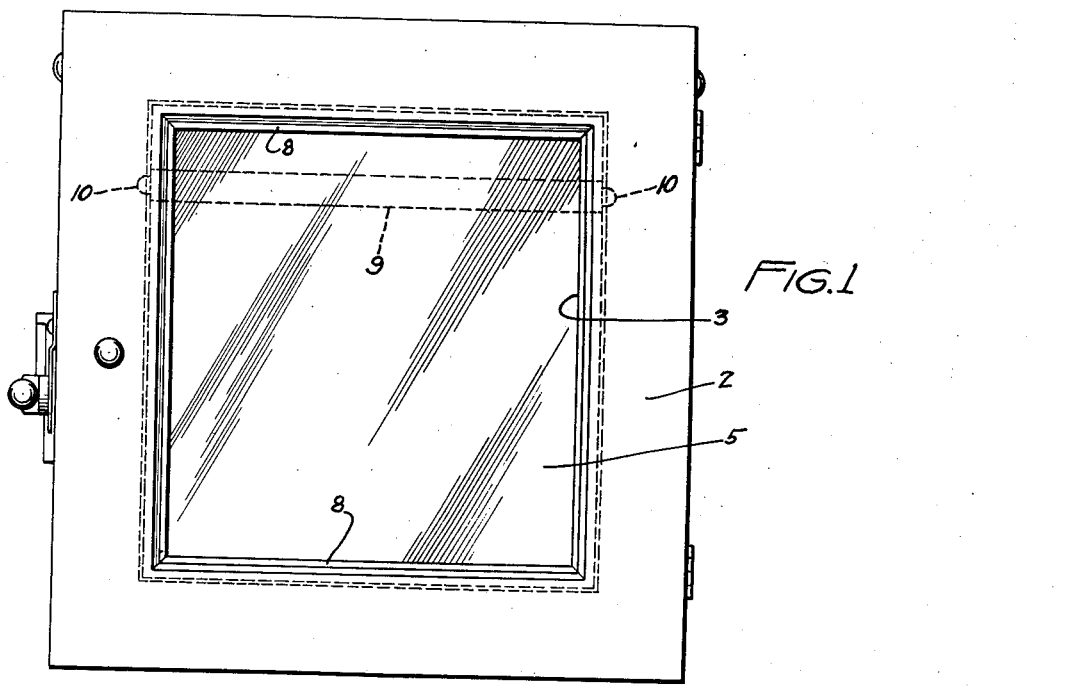
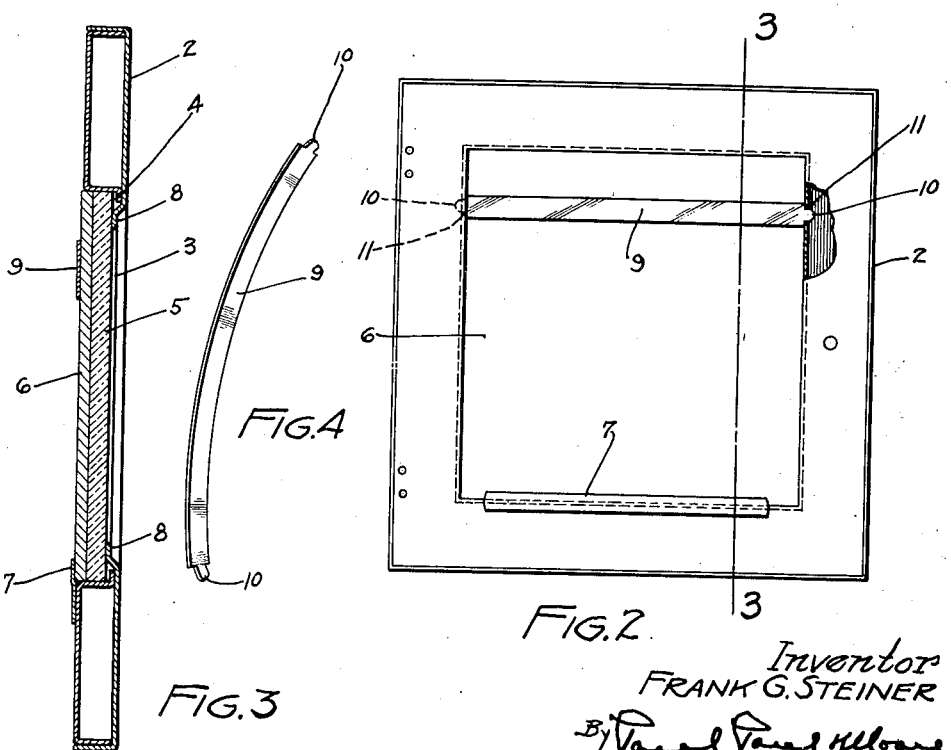
Inventor
FRANK G. STEINER
ATTORNEYS Patented Nov. 27, 1934

1,981,971

UNITED STATES PATENT OFFICE 1,981,971

MIRROR MOUNTING

Frank G. Steiner, Chicago, Ill., assignor to Steiner Sales Company, Salt Lake City, Utah, a corporation of Utah Original application June 17, 1929, Serial No. 371,397, now Patent No. 1,908,566, dated May 9, 1933. Divided and this application January 15, 1931, Serial No. 508,860

2 Claims. (Cl. 45—18)

This application is a division of my pending case, Serial Number 371,397, filed June 17, 1929, which has resulted in Patent 1,908,566, dated May 9, 1933.

It is customary in the manufacture of cabinets, cupboards of various kinds, and doors to mount a mirror in the panel and generally the mirror is permanently secured and forms an inseparable part of the door. This adds considerably to the freight rate when the cabinet or door is to be shipped from place to place.

The object, therefore, of my invention is to provide an improved means for securing or mounting the mirror in the door panel to the end that the mirror and the cabinet or door may be shipped separately and assembled when set up at destination, and thereby a considerable saving can be effected in freight charges.

A further object is to provide an improved mirror mounting which will permit it to be easily and quickly removed and a new one substituted in case of breakage or when a substitution is desired for any purpose.

A further and particular object is to provide a mirror applicable to the door of a towel cabinet and capable of being shipped independently of the cabinet.

The invention consists generally of various constructions and combinations, all as hereinafter described and particularly pointed out in the claims.

In the accompanying drawing forming a part of this specification

Figure 1 is a front view of a cabinet with a mirror mounted in the door thereof, the particular securing means for the mirror being indicated in dotted lines;

Figure 2 is a view of the inner side of the door, illustrating the mirror holding means;

Figure 3 is a sectional view on the line 3—3 of Figure 2; and

Figure 4 is a perspective view of the flexible bar by means of which the mirror is held in place in the panel of the door.

In the drawing, 2 represents the door of a suitable cabinet provided with a panel opening 3. The door may comprise inner and outer telescoping sections and be thick enough to receive a mirror and its backing. The panel is preferably rectangular in form and has a seat 4 formed in the rails or side walls thereof and a mirror 5 generally of plate glass is adapted to fit within the panel against the seat 4. A plate 6 of suitable material is fitted within the panel in the rear of the mirror, a flange 7 being provided on the door at the lower edge of the panel to project upwardly into the opening of the panel and form a gap between it and a flange 8 on the opposite side of the panel opening.

In mounting the mirror in the door, the lower edge of the plate is inserted between the flanges 7 and 8 and the upper edge inserted into the opening to rest against the seat 4 and the upper flange 8. The plate 6 is then inserted in the rear of the mirror plate, as shown plainly in Figure 3, with its lower edge held in place by the flange 7. A band 9 of spring material, slightly bowed, has end tongues 10 that are adapted to fit into sockets 11 in the side walls of the panel opening, as shown plainly in Figure 2. To mount the band, one end is inserted into the socket on one side of the panel and the band flexed or bent sufficiently to allow the other end to enter the opposite socket and when this has been done the tension of the band and its pressure on the inner face of the plate 6 will hold the mirror firmly in position in the door without the use of screws or other fastening means requiring a tool to loosen or secure them.

A mirror securing means of this description will allow the purchaser of a cabinet to easily and quickly install the mirror in the door, and will also permit the manufacturer to ship the mirror and door separately and thereby effect a considerable saving in freight rates.

The mirror is shown in this application with a holding means adapted particularly for a wall cabinet, such as one used for vending a clean towel, but I do not confine myself to this application, as this holding means for the mirror may be utilized wherever it is desired to support a mirror in a frame for convenient installation and removal and where it is desired to effect an economy incident to the shipping of the mirror and cabinet or other supporting means separately.

In various ways the details of construction herein shown and described may be modified and still be within the scope of my invention.

I claim as my invention:

1. A cabinet having a door provided with an opening, one edge of said opening having a lip thereon and said opening having a seat, and a mirror fitting said seat within the plane of said opening, and a band of spring material adapted to engage opposite edges of said opening and extend across said opening from side to side in the rear of said mirror, said band being formed to exert a pressure on the rear of said mirror.

2. A door having an opening, said door comprising telescoping parts, one part having a flange which extends into the opening to form a support thereon and the other part having an opposed flange, one of said parts being provided with opposite sockets, a mirror fitted into the opening and between the flanges and a slightly bowed band of spring material extending across the back of the mirror with its ends engaging said sockets and its bowed part contacting with the mirror, said band being under tension to hold the mirror in its seat in the opening.

FRANK G. STEINER.